United States Patent [19]
Wright

[11] Patent Number: 5,381,940
[45] Date of Patent: Jan. 17, 1995

[54] TRAY COMBINATIONS

[75] Inventor: David W. Wright, Grand Blanc, Mich.

[73] Assignee: Durakon Industries, Inc., Lapeer, Mich.

[21] Appl. No.: 33,968

[22] Filed: Mar. 19, 1993

Related U.S. Application Data

[60] Continuation of Ser. No. 792,704, Nov. 15, 1991, abandoned, which is a division of Ser. No. 513,379, Apr. 23, 1990, Pat. No. 5,094,375.

[51] Int. Cl.⁶ ................................................ B60R 7/02
[52] U.S. Cl. ................................. 224/42.42; 220/533; 224/273
[58] Field of Search ............... 224/42.42, 273; 220/532, 533; 296/37.1, 37.6, 39.1, 39.2

[56] References Cited

U.S. PATENT DOCUMENTS

| | | | |
|---|---|---|---|
| 2,081,078 | 5/1937 | Watson | 220/533 X |
| 2,695,112 | 11/1954 | Bonnevay | 220/533 X |
| 4,226,348 | 10/1980 | Dottor et al. | 224/42.42 |
| 4,488,669 | 12/1984 | Waters | 224/273 |
| 4,577,773 | 3/1986 | Bitel | 220/533 |
| 4,593,816 | 6/1986 | Langenbeck | 220/533 X |
| 4,728,017 | 3/1988 | Mullican | 224/42.42 |
| 4,767,149 | 8/1988 | Rye | 224/42.42 X |
| 4,779,752 | 10/1988 | Vallee et al. | 220/533 |
| 4,848,626 | 7/1989 | Waters | 224/273 |
| 4,884,733 | 12/1989 | Geeves | 220/533 X |
| 4,887,947 | 12/1989 | Bott | 296/39.2 X |
| 4,889,232 | 12/1989 | Asleson | 220/533 X |
| 4,944,544 | 7/1990 | Dick | 224/42.42 X |
| 4,946,215 | 8/1990 | Taylor | 224/42.42 X |
| 4,986,590 | 1/1991 | Patti et al. | 296/39.2 |

Primary Examiner—Robert M. Fetsuga
Attorney, Agent, or Firm—Reising, Ethington, Barnard, Perry & Milton

[57] ABSTRACT

A tray is adapted for use as a protective and organizational device in vehicles. The tray is comprised of bottom and side wall portions, the side wall portions rising above the perimeter of the bottom portion forming an opening into the tray. A separating organizer is provided having spaced apart vertical support members which support a horizontal support member. The horizontal support member has a plurality of extending separation arms which are used to abut and support a transported container, thereby resisting any tendency the container may have to tip. A protective tray is also provided which is supported by the tailgate or side wall of a pick-up truck. A cover is provided over the opening of the tray, eliminating any contact between outside elements and the contents of the tray.

1 Claim, 5 Drawing Sheets

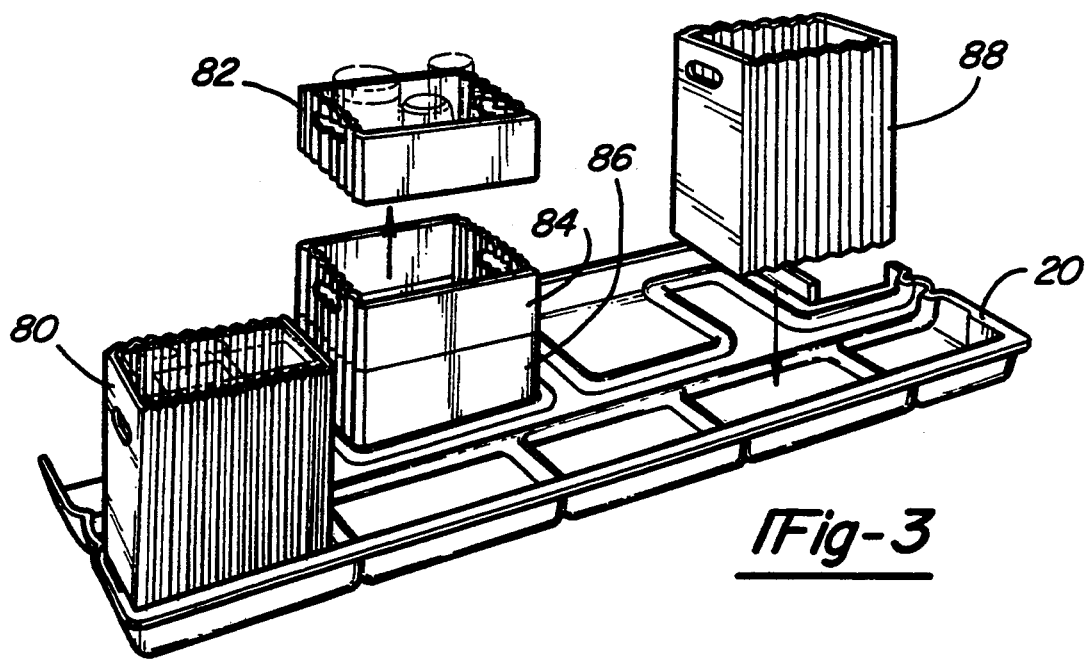
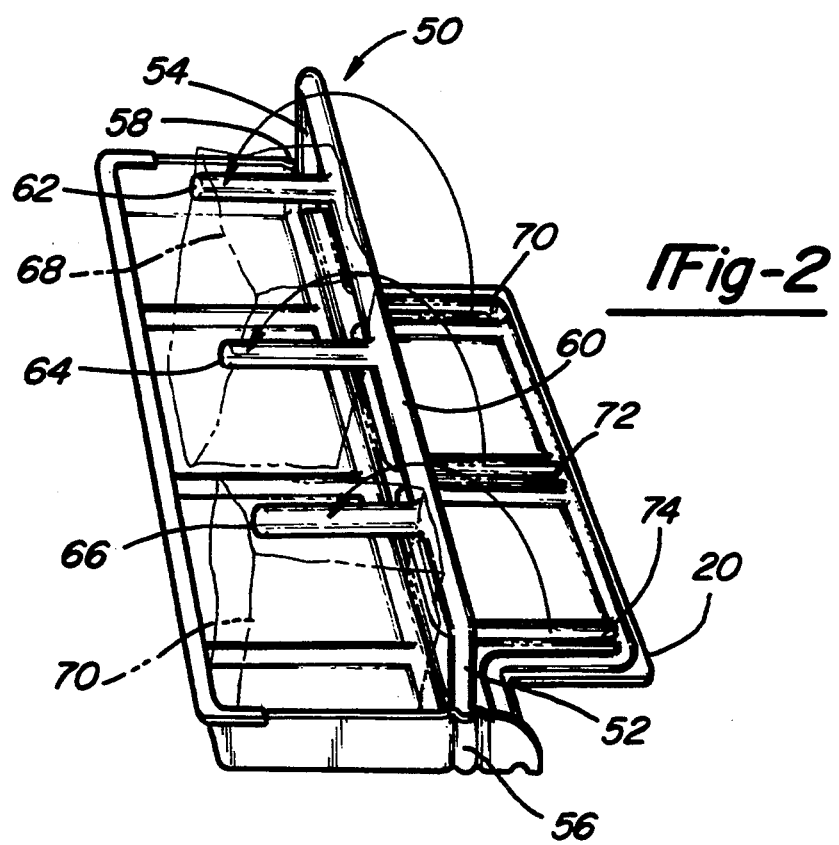

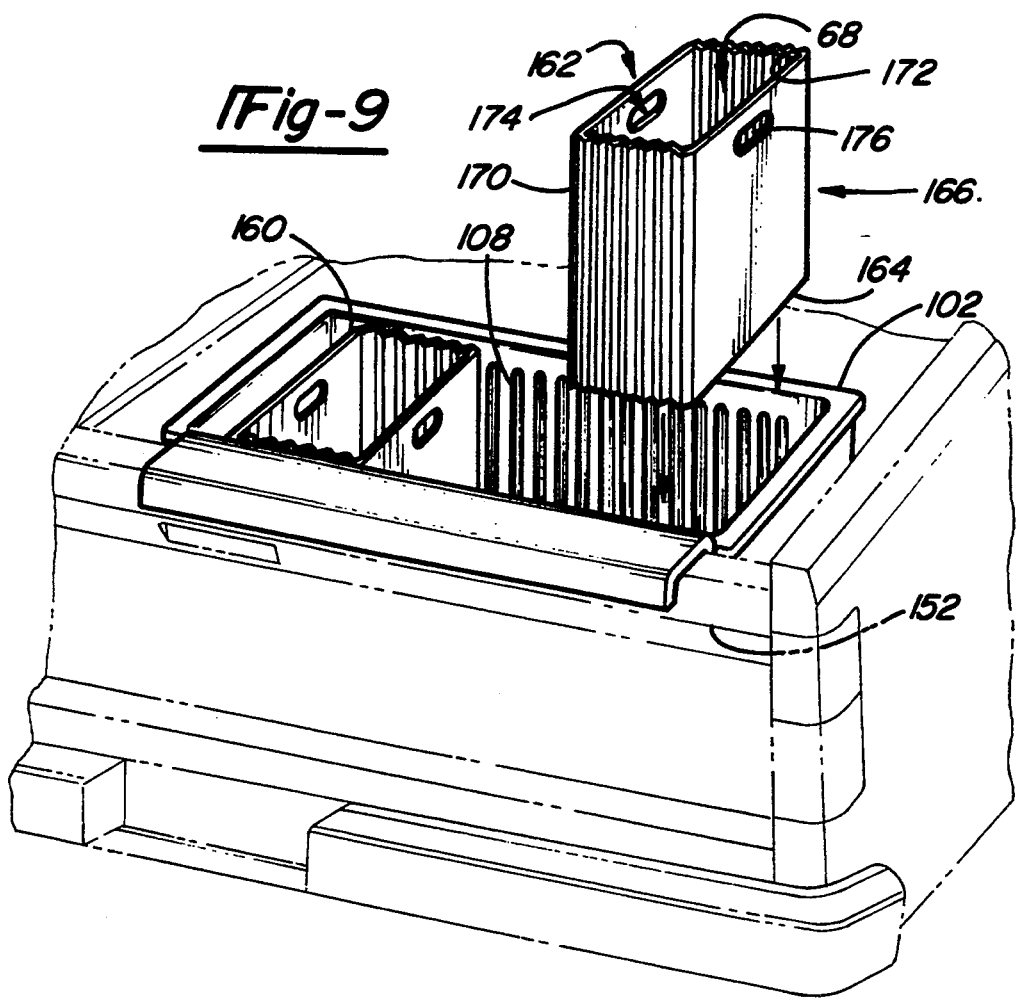
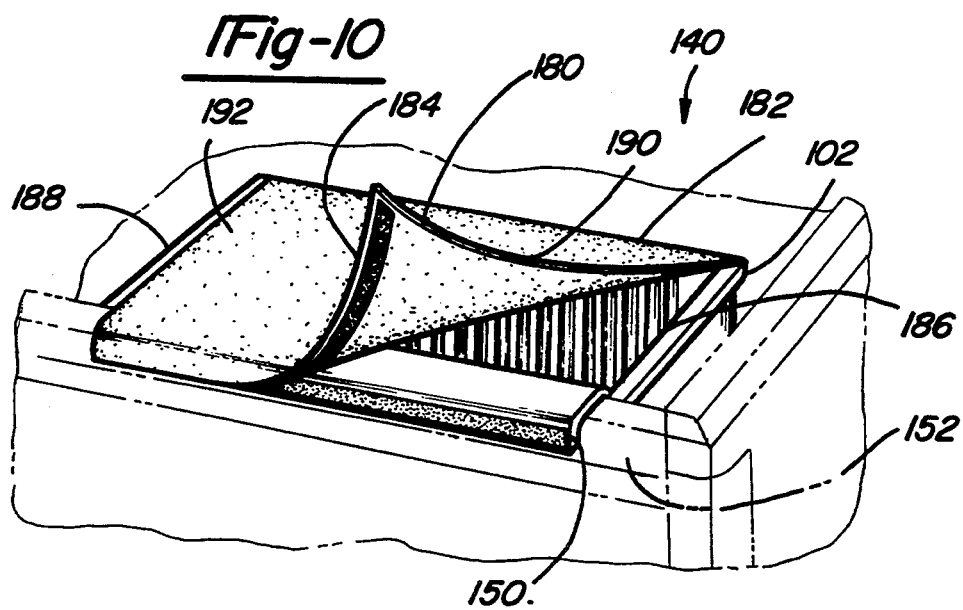

TRAY COMBINATIONS

This application is a continuation of application Ser. No. 792,704, filed Nov. 15, 1991, abandoned, which is a division of application Ser. No. 513,379, filed on Apr. 23, 1990, U.S. Pat. No. 5,094,375.

BACKGROUND OF THE INVENTION

The present invention relates generally to trays used in vehicles and more specifically relates to trays which are used in vehicles for the purpose of organizing transported goods and protecting vehicle surfaces.

A problem present in most general-purpose vehicles, such as cars, pick-up trucks and the like, is that they do not provide a way of organizing or separating transported goods. For example, although most automobiles provide a trunk or hatchback space for transporting items such as groceries, there is no way to keep grocery bags from tipping over and sliding within the storage space during transportation. Another problem is encountered when liquids are inadvertently spilled while being transported by a vehicle. Most vehicles are not designed to contain liquid spillage, and therefore any spillage which does occur is allowed to seep into the vehicle's carpeting, etc.

Still a further problem exists when a pick-up truck is used to transport loose items in its bed area. Because the bed area is open and unconfined, relatively loose items, such as grocery bags, etc., do not stay stationary during transportation. These items tend to tip over, thereby releasing their contents into the bed and allowing their contents to roll around freely. Thus, the present invention relate to trays and containers which are used to organize and retain items being transported by a vehicle and are also used to protect vehicle surfaces from scratching, spillage and the like. A tray is disclosed which achieves the above, while also being strong, lightweight, durable, corrosion-resistant and inexpensive to manufacture.

SUMMARY OF THE INVENTION

The present invention provides an improved vehicle tray which is adapted to be conveniently constructed in various sizes. The tray permits various sizes and shapes of articles to be stored and segregated while providing a means for containing any liquids which are inadvertently spilled during transportation. The tray also provides for a strong, lightweight, corrosion-resistant and relatively inexpensive construction.

The disclosed organizing and protecting tray for use in a vehicle includes a body having a bottom and vertical side wall portions, the side wall portions surrounding and generally rising above the outside perimeter of the body, the body having a plurality of spaced apart, leak-proof depressions formed therein, each of the depressions adapted to receive a container and resist any tendency of the container to move out from the depression, the depressions also contain any substance spilled from the container. The tray preferably has a separating organizer which has two spaced apart vertical support members which are received by and extend above the side wall portions of the tray body. The separating organizer also has a horizontal support member extending between and fastened to the two vertical support members, the horizontal support member disposed above the side wall portions and having a plurality of horizontally extending separation arms. The arms abut the containers being transported and resist any tipping tendency of the container. The separating organizer is preferably detachable from the side wall portions, and the tray body is adapted to receive and store the organizer when it is not used.

The tray body preferably has a plurality of receiving channels located between the plurality of spaced apart leak-proof depressions where each channel is associated with a respective separation arm, and each channel is adapted to receive and retain a respective separation arm for the purposes of storing the separating organizer when it is not used.

In another aspect, an organizing and protecting tray for use in a vehicle is provided comprising a carrying receptacle having a bottom portion and vertical side wall portions, the side walls surrounding and rising above the outside perimeter of the bottom portion and being vertically directed to form an opening into the carrying receptacle, the bottom and side walls having a plurality of ribs. Divider means are provided which are selectively engagable with the ribs such that storage compartments are formed within said receptacles, the divider means having opposing ends and a bottom edge, the opposing ends adapted to engage the side wall ribs, and the bottom edge adapted to engage one of the bottom ribs of the receptacle, the engagement between the divider and the ribs being of the type which will prevent any substantial liquid seepage between adjacent storage compartments.

In another embodiment, the divider means extends substantially above the receptacle side walls, this divider height being of advantage in that it opposes any tendency of the storage container to tip-over during transporting.

Still, in a further embodiment for use in pick-up trucks, a tray is provided where one vertical side wall portion of the receptacle has an extending supporting arm, the arm adapted to be placed over a side wall for the tailgate of a pick-up truck, thereby using the side wall or the tailgate to support the receptacle and its contents. In a preferred embodiment, a removable receptacle is provided for placement inside of the carrying receptacle, the removable receptacle having bottom and side wall portions, the side wall portions being vertically directed to form an opening into the removable receptacle for providing access into the interior thereof, the vertically directed walls having a plurality of vertically directed ribs which engage the ribs of the side walls of the carrying receptacle, the rib engagement between the carrying receptacle and the removable receptacle acting to prevent the removable receptacle from tipping over or sliding within the carrying receptacle. The tray of this embodiment preferably includes a removable cover which substantially spans the carrying receptacle opening, the cover protecting the contents of the carrying receptacle from exposure from outdoor elements.

BRIEF DESCRIPTION OF THE DRAWINGS

FIG. 2 is a perspective view of the tray of FIG. 1, in isolation, utilizing a separating organizer.

FIG. 3 is a perspective view of the tray of FIG. 1, in association with a plurality of removable receptacles.

FIG. 9 is a perspective view of the tray of FIG. 8 in association with a plurality of removable receptacles.

FIG. 10 is a perspective view of the tray of FIG. 8 in association with a removable cover.

DETAILED DESCRIPTION OF THE EMBODIMENTS

Figure 1:
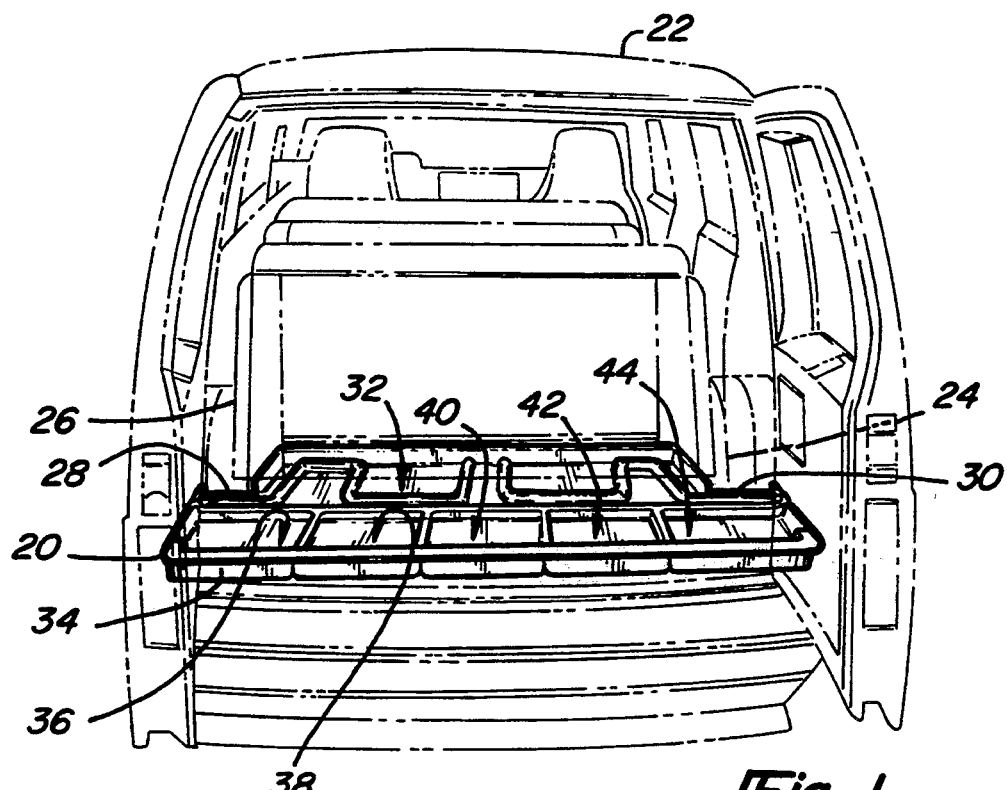
FIG. 1 is a perspective view of a van in association with a tray of the present invention.

Referring now to the drawings, FIG. 1 depicts a tray 20 which is placed on the floor of the cargo area of van 22. Tray 20 is adapted to conform to the various projections encountered in the cargo area. For example, interior wheel wells 24, 26 project into the cargo area, and accordingly, receiving indentations 28, 30 are designed into tray 20 so that it accommodate wheel wells 24, 26 and still lay on the van floor. Other obstructions may be present in various van designs. For example, one may encounter spare tire protrusions, gas tank or gas filler tube protrusions and the like. Each van design poses different cargo floor layouts, and accordingly, each tray 20 must be designed to accommodate a particular van design. Tray 20 may be constructed from any number of lightweight, liquid-resistant materials such as Fiber-glas ™, plastic, rubber and the like.

Tray 20 is comprised of a bottom portion 32 and a vertical side wall portion 34 surrounding the outside perimeter of bottom 32. The body 32 of tray 20 has a plurality of spaced apart, leak-proof depressions 36-44 formed therein. Each one of the depressions 36-44 is sized so that it will easily receive a bag of groceries or similarly shaped container. The depressions act to resist any tendency of a transported container to slide or move out from its respective depression. Additionally, the depressions will also contain and hold any substance which is inadvertently spilled during transportation. The spilled substance will stay in the leak-proof depression until it can be removed at a later time. In a preferred embodiment, it is contemplated that tray 20 is made from a high-impact, strong, lightweight plastic which is impervious to sunlight, heat and mild chemicals. In a preferred embodiment, tray 20 is constructed from high-density polyethylene. Tray 20 should be sized so that it can be easily removed for washing or cleaning outside of the van.

As is evident from FIG. 1, tray 20 will keep the cargo area organized. The plurality of leak-proof depressions prevents items from mixing together and/or spilling onto the vehicle floor. It is contemplated that various accessories could be sold to accompany tray 20. For example, an emergency road aid kit, towing chain kit, car care carry-all, cooler, sport kit, etc. could all be sold as accessories and provided in a container which would be adapted to be received in one of the depressions. Additionally, the color and texture of the accessories container could be coordinated to that of tray 20 to give an attractive appearance to the ensemble.

Now referring to FIG. 2, tray 20 of FIG. 1 is shown in conjunction with a separating organizer 50. The organizer 50 has two vertical spaced apart members 52, 54. One end of each of the vertical support members 52, 54 is received by a respective receiving depression 56, 58 within tray 20 (receiving depression 58 only partially shown in FIG. 2). Receiving depressions 56, 58 keep vertical support members 52, 54 vertically erect during use. Horizontal support member 60 extends between and is fastened to each vertical support member. Horizontal member 60 has a plurality of extending separation arms 62-66. These separation arms 62-66 are positioned directly above the spaces between depressions and are designed to abut containers 68, 69 near their respective top-most portion. By abutting containers 63, 69, support arms 62-66 resist any tendency of containers 68, 69 to tip.

Tray 20 is designed with a plurality of receiving channels 70-74. These receiving channels 70-74 are adapted to receive separation arms 62-66. Receiving channels 70-74 provide a means for storing organizer 50 when it is not in use. When organizer 50 is not needed, it is lifted vertically from its receiving depressions 56, 58 and rotated 180 degrees about the longitudinal axis of horizontal support member 60. Vertical support members 52, 54 are then lowered into their respective receiving depressions 56, 58, and separation arms 62-66 are in a position to be received by their respective receiving channels 70-74. When organizer 50 is to be used, it is simply removed from this storage position and placed back into receiving depressions 56, 58 in its operational position.

Now referring to FIG. 3, a plurality of removable receptacles 80-88 are shown in various depressions of tray 20. Removable receptacles 80, 88 are of the stand-alone type which are each received in a respective tray depression. These receptacles 80, 88 can be used to hold loose items and can be carried from the vehicle to another location for unloading. Removable receptacles 82, 84 and 86 are of the stackable type and accordingly can be mounted one on top of the other in order to conserve cargo space. The base of removable receptacles (base detail not shown) 82, 84 and 86 is adapted to interlock with the top of the receptacle directly below it, thereby preventing any relative movement between two adjacent stacked receptacles. It is envisioned that removable receptacles 80-88 are constructed of lightweight, high-density plastic. This will provide for easy maintenance and portability.

Figure 4:
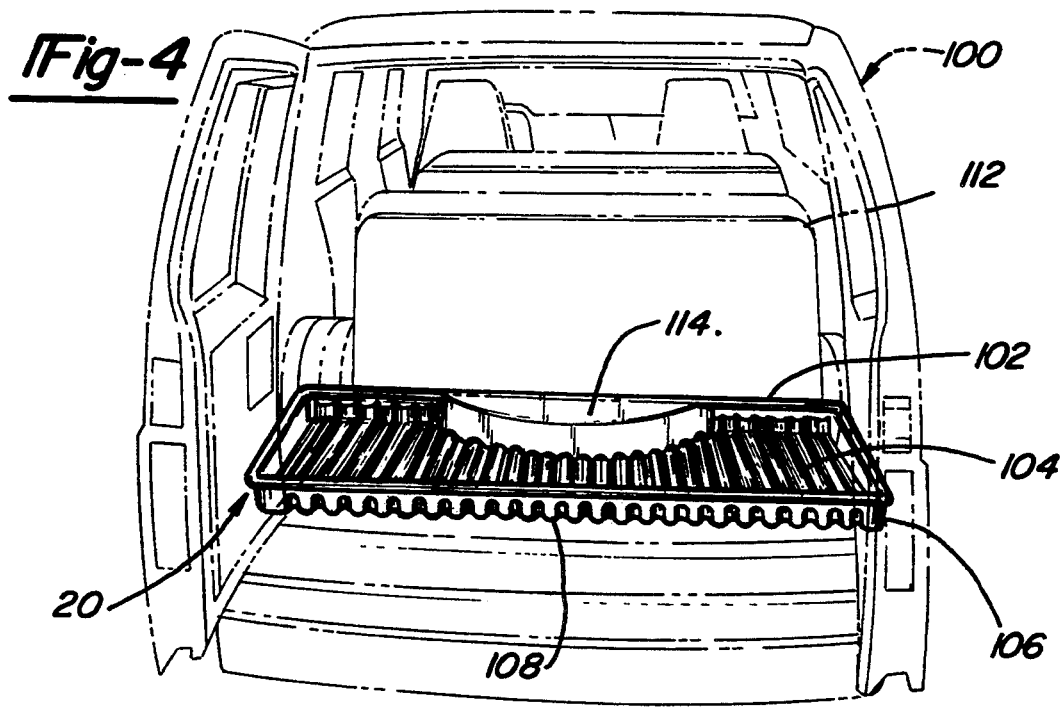
FIG. 4 is a perspective view of a second embodiment of the disclosed tray in association with the cargo area of a van.

Now referring to FIG. 4, van 100 is shown in association with a second embodiment of tray 20. In its most fundamental form, tray 20 is comprised of a carrying receptacle 102. Carrying receptacle 102 has a bottom portion 104 and vertical side wall portions 106. The vertical side walls 106 surround and rise above the outside perimeter of bottom 104. Vertical side walls 106 are vertically directed to form an opening into the carrying receptacle 102. The bottom 104 and side walls 106 have a plurality of ribs 108. Vertical side walls 106 join bottom 104 and form a liquid-tight receptacle. Any liquid spillage will be contained within receptacle 102. Receptacle 102 must adapt to the interior contours of the cargo area of van 100. For example, spare tire (not shown) protrudes from under the rear seat 112. Spare tire is accommodated by carrying receptacle 102 by introducing an indentation 114 into the carrying receptacle's rearward wall 106 and bottom 104 portion.

Figure 5:
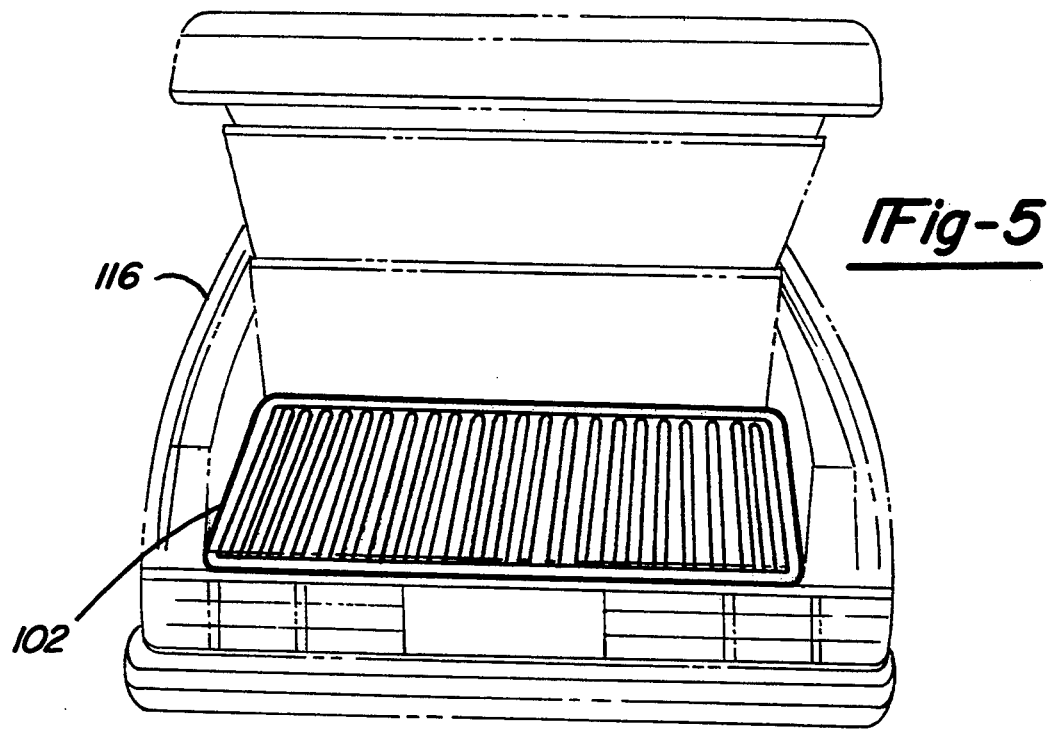
FIG. 5 is a perspective view of the tray disclosed in the present invention in association with the cargo area of a hatchback-type vehicle.

Now referring to FIG. 5, carrying receptacle 102 is shown in association with a hatchback-type vehicle 116.

Figure 6:
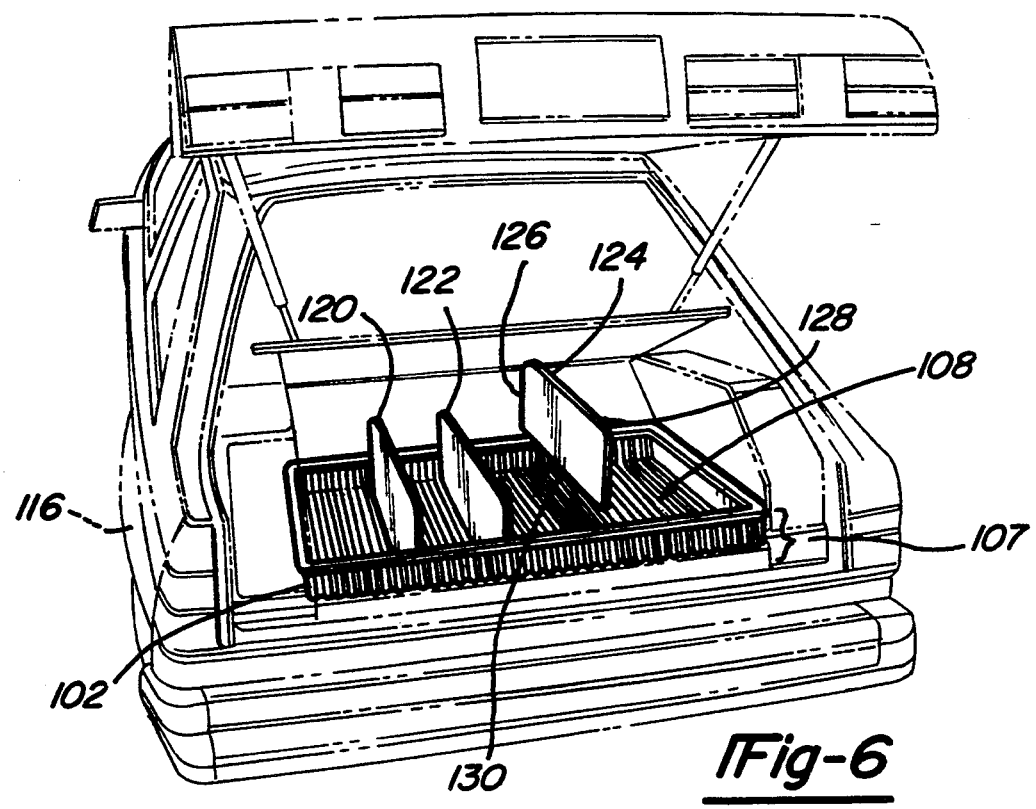
FIG. 6 is a perspective view of the tray of FIG. 5 in association with divider means.

Now referring to FIG. 6, hatchback vehicle 116 is shown having carrying receptacle 102 placed within its cargo carrying area. Carrying receptacle 102 is of the same type as described in FIGS. 4 and 5 but shows the addition of divider means 120-124. Each one of divider means 120-124 has two opposing ends typified at 126, 128 and a bottom edge 130. Divider means 120-124 are adapted to selectively engage with ribs 108 such that storage compartments are formed within the receptacle 102. The bottom edge 130 of divider means 124 and the opposing ends 126, 128 of divider means 124 are adapted to engage selected ribs 108 of the receptacle 102 such that the engagement forms a liquid-tight seal which prevents any substantial liquid from transferring between adjacent storage compartments. Accordingly, each divider 120-124 not only provides a compartmentalization of carrying receptacle 102 but also provides a liquid-tight compartment, thereby preventing any liquid which is present in one compartment to transfer to an adjacent compartment. Divider means 120-124 may be placed in any position within receptacle 102 which does not have a divider already present. Accordingly, many different size containers can be accommodated by receptacle 102 by simply placing the container in receptacle 102 and then slipping a divider in selected ribs 108 which fall adjacent to the side of the container.

It is important to note that the height of each divider means 120-124 is shown substantially greater than side wall height 107. By having the divider means 120-124 of substantial height, taller packages can be placed within receptacle 102 without having a tendency to tip over while the vehicle is turning. Thus, it can be seen from FIG. 6 that receptacle 102 provides a convenient and flexible way to organize a plurality of containers of various sizes and shapes.

Figure 7:
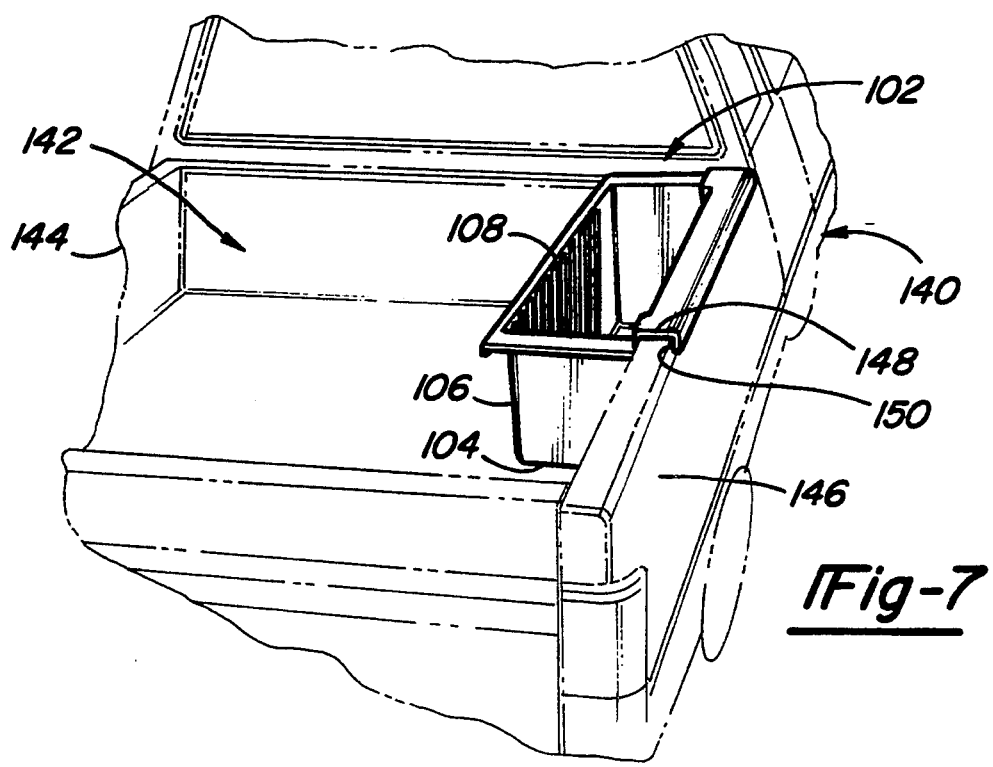
FIG. 7 is a perspective view of the tray of the present invention in association with the side wall of a pick-up truck.

Now referring to FIG. 7 of the drawings, pick-up truck 140 is shown having a conventional bed area and a pair of opposing side walls 144, 146. Side wall 146 is shown supporting a third embodiment of receptacle 102. Receptacle 102 has a bottom portion 104 and vertical side wall portions 106. Vertical side wall portions 106 surround the bottom portion 104 and rise above the bottom portion 104 to form an opening into the carrying receptacle. The bottom 104 and vertical side wall portions 106 have a plurality of ribs 108. One of the vertical side walls 106 has an extending support arm 148 which is adapted to be placed over the side wall 146 of pick-up truck 140. Extending support arm 148 supports carrying receptacle 102 and its content (contents not shown) from the side wall 146 of pick-up truck 140. By utilizing carrying receptacle 102, loose items and items which would otherwise be free to move within bed 142 are confined within receptacle 102. Receptacle 102 also provides an easy way of accessing transported goods inasmuch as it makes them accessible from the immediate side of the pick-up truck without having to reach down to the floor of bed 142. Extending support arm 148 is terminated in a downward lip 150 which prevents receptacle 102 from disengaging from side wall 144 due to vibration or other forces encountered during use.

Figure 8:
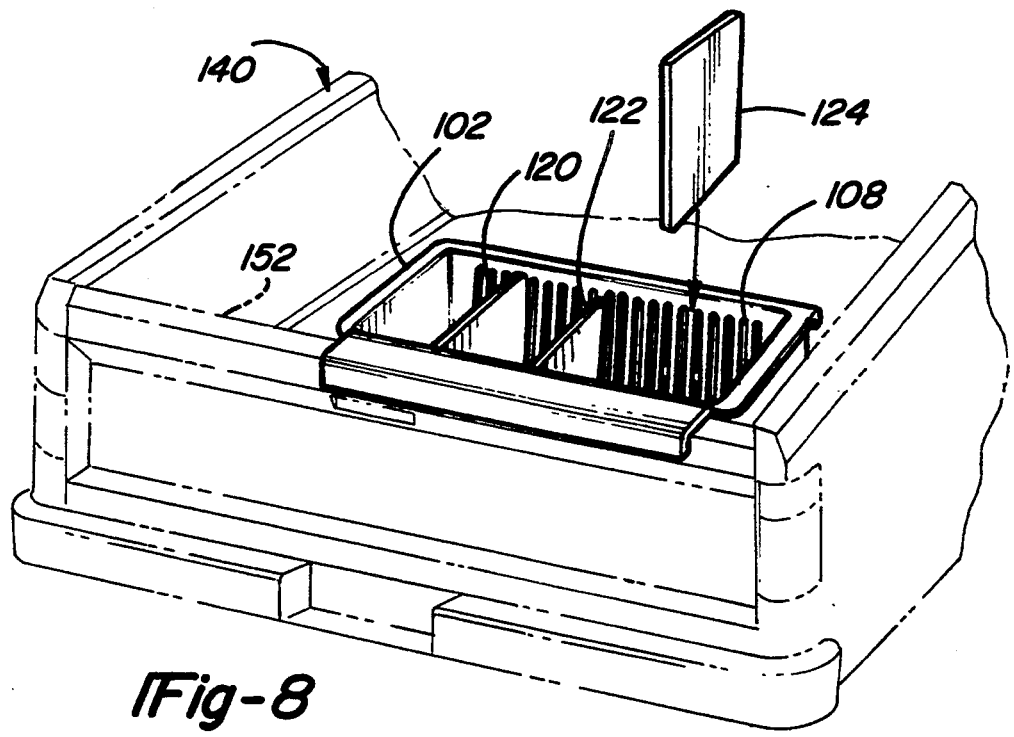
FIG. 8 is a perspective view of the tray of FIG. 7 in association with the tailgate of a pick-up truck.

Now referring to FIG. 8, receptacle 102 is shown as it is used in engagement with the tailgate 152 of pick-up truck 140. Receptacle 102 is exactly as was described in FIG. 7, except it is shown in FIG. 8 with dividing means 120-124. Dividing means 120-124 provides the same function in receptacle 102 shown in FIG. 8 as they did in the embodiment of receptacle 102 shown in FIG. 6. Namely, they provide for physical separation between items stored in receptacle 102 along with providing a liquid-resistant barrier which prevents any liquid transfer between adjacent compartments. Divider means 120-124 are selectively engagable with ribs 108 to provide a plurality of different compartment sizes which are used to accommodate a plurality of different size containers.

Now referring to FIG. 9, carrying receptacle 102 is shown supported by tailgate 152. Receptacle 102 is adapted to receive a plurality of removable receptacles 160, 162. Each movable receptacle 160, 162 has a bottom 164 and side wall portions 166. The side wall portions 166 are vertically directed to form an opening 168 into each removable receptacle for providing access into the interior thereof. The side wall portions 166 have vertically directed ribs which are adapted to engage the ribs of the side walls of the carrying receptacle 102 (ribs of the carrying receptacle shown at 108). Because the ribs on the removable receptacle exist on opposing sides 170, 172, they secure removable receptacle 162 within the carrying receptacle 102 in a way which prevents any sideways sliding of removable receptacles 160, 162 within carrying receptacle 102. Of course, removable receptacles 160, 162 are easily slid down into and up out of carrying receptacle 102, and the vertically directed ribs do not interfere in any way with this vertical motion. Apertures 174, 176 are provided through the side wall portions 166 of removable receptacles 160, 162. These apertures aid in carrying removable receptacles 160, 162 and placing them in and taking them out of carrying receptacle 102.

Now referring to FIG. 10, carrying receptacle 102 is shown supported by tailgate 152 of pick-up truck 140. Carrying receptacle 102 is precisely the same as that described in conjunction with FIG. 9, the only difference being that it is fitted with a weatherproof cover 180. Weatherproof cover 180 is preferably constructed of a durable material such as vinyl, nylon, etc. and is hingedly fastened to one of its vertical side wall edges 182. Cover 180 has a second edge 184 which opposes edge 182 and is adapted to fasten to downward lip 150 of carrying receptacle 102. It is contemplated that means for fastening cover 180 to downward lip 150 is best accomplished by way of Velcro TM fasteners, snaps or the like, the most important consideration being that the fastening means employed should be durable and able to withstand outdoor conditions. To further secure the contents of carrying receptacle 102 (contents not shown), Velcro TM can be fitted along cover edges 190, 192 and corresponding receptacle side wall edges 186, 188, thereby providing a complete weatherproof seal around the opening of carrying receptacle 102.

The foregoing detailed description shows that the preferred embodiments of the present invention are well suited to fulfill the objects stated. It is recognized that those skilled in the art may make various modifications or additions to the preferred embodiments chosen here to illustrate the present invention, without departing from the spirit of the present invention. For example, ribbed edges were chosen as a means to engage the carrying receptacle with the removable receptacle. Other forms of engagement could be used, such as tabs, magnets, etc. It is also contemplated that various accessories could be added to the carrying receptacle such as locks, carrying handles, etc. without departing from the scope or spirit of the present invention. Accordingly, it is to be understood that the protection sought to be afforded hereby should be deemed to extend to the subject matter defined in the appended claims including all fair equivalents thereof.

What is claimed is:

1. A vehicular cargo area organizer comprising: a vehicle having an enclosed cargo storage area including a cargo floor bordered by generally vertically extending peripheral cargo area boundaries; a tray disposed in said enclosed cargo storage area and fabricated from an inorganic polymeric material; said tray including a bottom portion supported upon said cargo floor and a plurality of vertical side walls surrounding a rising above the perimeter of said bottom portion to form an opening into said tray; each of said side walls being disposed directly adjacent one of said cargo storage area boundaries and having a shape closely conforming to the adjacent said cargo storage area boundaries such that the lateral distance between each of said side walls and the respective adjacent said cargo area boundaries are substantially equal thereby form-fitting said tray in said enclosed cargo storage area; a peripheral flange extending outwardly from said side walls; said bottom portion of said tray including a plurality of ribs; and divider means selectively engageable with said ribs for forming storage compartments within said tray, said divider means extending substantially vertically above said side walls to oppose any tendency of a storage container to tip during transportation.

* * * * *